(12) United States Patent
Preti et al.

(10) Patent No.: US 7,056,948 B2
(45) Date of Patent: Jun. 6, 2006

(54) USE OF ODOR REDUCING AND CROSS-ADAPTING AGENTS TO REDUCE ANIMAL WASTE MALODORS

(75) Inventors: George Preti, Horsham, PA (US); Charles Wysocki, Collingswood, NJ (US)

(73) Assignee: Monell Chemical Senses Center, Philadelphia, PA (US)

( * ) Notice: Subject to any disclaimer, the term of this patent is extended or adjusted under 35 U.S.C. 154(b) by 547 days.

(21) Appl. No.: 09/887,970

(22) Filed: Jun. 22, 2001

(65) Prior Publication Data

US 2002/0046710 A1    Apr. 25, 2002

Related U.S. Application Data

(60) Provisional application No. 60/213,629, filed on Jun. 23, 2000.

(51) Int. Cl.
*A01N 37/06*    (2006.01)

(52) U.S. Cl. .................. 514/549; 424/400; 424/401; 424/405; 424/409; 424/421; 424/125; 424/630; 424/638; 424/653; 424/76.1; 424/76.4; 424/76.6; 424/76.7; 514/546

(58) Field of Classification Search ............... 424/76.1, 424/76.3, 76.4, 76.5, 76.9, 125, 400, 401, 424/405, 409, 421, 76.6, 76.7, 630, 653–638; 514/529, 546, 549
See application file for complete search history.

(56) References Cited

U.S. PATENT DOCUMENTS 4,278,047 A * 7/1981 Luca ........................... 119/173
5,885,599 A * 3/1999 Peterson et al. ............ 424/405

FOREIGN PATENT DOCUMENTS

GB          1327353      *  8/1973

OTHER PUBLICATIONS

Blaser, M.J. "The bacteria behind ulcers" *Scientific Amer.*, 1996, pp 104-107.
Chernomorsky, S.A. et al., "Review article: Biological activities of chlorophyll derivatives", *N.J. Medicine*, 1988, 85, pp 669-673.
Cormick, N.A., et al., "In vitro antibacterial activity of bismuth subsalicylate" *Reviews of Inf. Diseases*, 1990, 12, Suppl 1: S9-10.
Doty, A.E., "The control of odor in urinary incontinence" *Nursing Homes*, 1971, pp 20-28.
*Federal Register*, "Deodorant drug products for internal use for over the counter human use: final monograph" Final monograph 55 (#92), pp 19862-19865, 1990.
Goh et al., "*Helicobacter pylori* infection and non-ulcer dyspepsia: the effect of treatment with colloidal bismuth subcitrate" *Gastroenterol.*, 1991, 26, pp 1123-31.
Golden et al., " *Effective management of offensive odors*" *Gastroenterol*, 1956, 31, pp 260-265.
Persaud, K.C. et al., "Assessment of conducitng polymer odour sensors for agricultural malodour measurements" *Chem Senses*, 1996, 21, pp 495-505.
Pierce, J.D. et al., "Cross adaptation of sweaty-smelling 3-methyl 2-hexenoic acid by a structurally-similar, pleasant-smelling odorant", *Chem Senses*, 1995, 20, pp 401-411.
Pierce, J.D. et al. "Cross-adaptation of sweaty-smelling 3-methyl-2-hexenoic acid by its ethyl esters is determined by structural similiarity", *J Soc Cosmet Chem.*, 1996, 47, pp 363-375.
Siegel, L.H. " The control of ileostomy and colostomy odors", *Gastroenterol*, 1960, 38, pp 634-636.
Sox , T.E. et al., "Binding and killing of bacteria by bismuth subsalicylate", *Amer. Soc for Microbio*, 1989, 33, pp 2075-2082.
Suffet et al., Advances in Taste-and-Odor Treatment and Control, *American Water Works Assoc. Res. Found.*, 1995, pp 157-208.
Warburton, et al., Proceeding of the fourth international symposium on livestock wastes, 1980, pp 309-313.
Young R. W. et al., "Use of chlorophyllin in the care of geriatric patients" *J. Amer Geriatrics Soc*, 1980, 28, pp 46-47.
Bazemore R. A. et al., "Ameliorating swine slurry odors: an analytical and sensory approach", *Achems Abstracts*, pp 611, 2000.
Preti, G., "Ameliorating environmental odors: an analytical and sensory approach", *Monell Chemical Senses Center, Special Colloquim 2000*, pp 34-35.

* cited by examiner

*Primary Examiner*—Neil S. Levy
(74) *Attorney, Agent, or Firm*—Woodcock Washburn LLP

(57) ABSTRACT

Methods and compositions for reducing animal waste malodor using agents and cross-adapting agents are described.

12 Claims, 1 Drawing Sheet

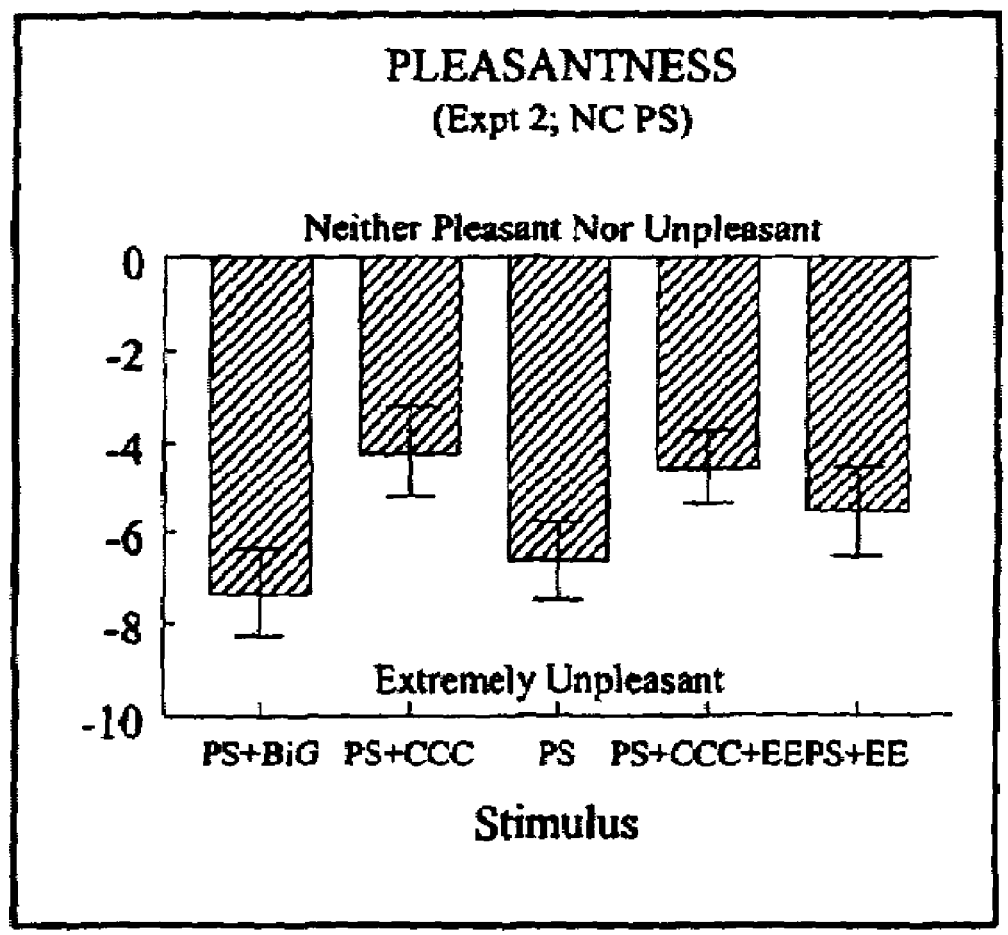

USE OF ODOR REDUCING AND CROSS-ADAPTING AGENTS TO REDUCE ANIMAL WASTE MALODORS

CROSS-REFERENCE TO RELATED APPLICATIONS

This application claims benefit of U.S. Provisional Application Ser. No. 60/213,629, filed Jun. 23, 2000, which is herein incorporated by reference in its entirety.

FIELD OF THE INVENTION

The present invention relates to the use of odor-reducing agents alone or in combination with cross-adapting agents to ameliorate or eliminate animal waste malodor.

BACKGROUND OF THE INVENTION

Odors emanating directly from manure or produced during its anaerobic digestion can create conflicts at the urban-rural interface. This may motivate pig and other domestic animal farm operations to relocate or reduce production as a means of limiting the odor problem. Both of these responses negatively impact agricultural economic interests. Similarly, domestic animals, such as dogs and cats, create malodor problems in their owner's home. Indeed, odors from human fecal waste in portable facilities and traditional outhouses can be prohibitive.

Persaud et al. reports that manure, fecal, and urine odors consist of volatile, odorous, organic acids as well as fecal-smelling sulfur compounds and indoles. Persaud et al., in *Chem. Senses*, 21:495–505, June, 1996. Persaud et al, however, does not disclose or suggest odor-reducing methods.

Agents previously used in odor reduction include compounds that have been approved and used for reduction of fecal malodor in human patients and reduction of malodor and off-flavors in human drinking water. Both bismuth compounds as well as chlorophyllin copper complex (CCC) have been approved by the Food and Drug Administration (FDA) for "internal deodorization" of human ostomy- and colostomy-related odors. *Federal Register*, final monograph 55 (#92) "19862–19865. Powdered activated charcoal (PAC) is routinely used by water utilities to remove unfavorable flavors and odors from potable drinking water. Suffet et al., *Amer. Water Works Assoc. Res. Found.*, 157–208, 1995. These substances act in several ways to reduce and/or eliminate odors. Pierce et al., *Chem. Senses*, 20: 401–411, 1995.

Chlorophyll is the major photo-synthetic porphyrin pigment in plants. Both it and several chemical derivatives appear to exhibit interesting biological activities. CCC is one of the derivatives of plant chlorophyll. Chernomorsky et al., *N. J. Medicine*, 85: 669–673, 1988, reports that CCC exhibited deodorizing properties when applied to foul smelling wounds and that CCC may be effective in controlling the odor problems of ostomy/colostomy patients.

Others report that the deep insertion of chlorophyll derivatives by patients into their colostomy bags led to significant deodorization. Golden et al., *Gastroenterol.*, 31: 260–265, 1956; Siegel, *Gastroenterol.*, 38: 634–636, 1960. These papers also report that oral administration of CCC to colostomy patients in doses of 100–200 mg daily was sufficient to control malodors without undesirable side effects. Chernomorsky et al. reports that dosages up to 800 mg/day have been safely used. Studies in which 100–200 mg doses of CCC were administered to patients with urinary and fecal incontinence problems resulted in a marked reduction in malodor after the first week of treatment. Young et al., *J. Amer. Geriatrics Soc.*, 28: 46–47, 1980; Doty, *Nursing Homes*, 20–28, 1971.

Although the exact mechanisms by which chlorophyll derivatives, such as CCC, promote deodorization are not fully understood, several hypotheses have been presented. First, chlorophyll exhibits antimicrobial effects upon microbes that produce malodorous materials (anaerobes). Second, the molecular structure of the molecule makes it able to interact with a variety of odorous materials that have free, lone pairs of electrons which may form inter-molecular (albeit not covalent) bonds with chlorophyll derivatives. As a result, chlorophyll derivatives have been found to bind tightly and immobilize odorous indole-like compounds produced by microbes. Third, chlorophyll derivatives may induce metabolic changes in odor-causing bacteria by altering certain enzymes or binding enzymes in these bacteria, thereby altering metabolic pathways with a subsequent diminution of odoriferous metabolites. Finally, the metal ion within CCC may act as the lone agent to influence and alter metabolism of bacteria. Copper may react directly with malodorous compounds such as volatile sulfur compounds to produce copper sulfides and take them out of the vapor phase, rendering any mixture that contains these compounds less odorous.

In addition to CCC, bismuth compounds have been shown effective in reducing fecal odor. Historically, bismuth compounds have been used to ameliorate gastrointestinal disorders. Modern studies have shown that relief comes as a result of these compounds acting on the gastrointestinal microflora. Cormick et al., *Reviews of Inf. Diseases*, 12 Suppl 1: S9–10, 1990; Sox et al., *Amer. Soc. for Microbio.*, 33: 2075–2082, 1989. Bismuth and its salts are toxic to many forms of microflora and can be used to treat many digestive disorders, including ulcers caused by the bacteria *Helicobactor pylori*. Goh et al., *Gastroenterol.*, 26: 1123–31, 1991; Blaser, *Scientific Amer.*, 104–107, Feb, 1996.

The bismuth compounds have also been used as part of treatments for reduction of malodor from fecal material. Bismuth subgallate (BiG) has been approved by the FDA for "internal deodorization" of ostomy and colostomy related odors. *Federal Register*, final monograph 55 (#92) "19862–19865. As reported therein, BiG pills can be taken orally and/or added to ostomy/colostomy bags.

The bismuth compounds act in two ways, either by reducing the number of odor-producing anaerobic intestinal microbes or by directly interacting with sulfur containing compounds which are thought to be the primary malodor producing volatiles. Chernomorsky et al., *N.J. Medicine*, 85: 669–673, Aug. 1988. Bismuth compounds may also interact with organic acids to form organic acid bismuth salts, further inhibiting their volatility and, as a result, inhibiting their ability to be odoriferous.

PAC has been used by water utilities to absorb odorants and tastants from an aqueous environment via vigorous mixing. PAC provides a large surface area on which odorous organic compounds can be absorbed and retained. Although PAC, in various particle sizes, has also been used as a sorbent by chemists and physicians, its potential use as an odor absorber in other applications has not been examined.

Previous use of powdered carbon proved ineffective at reducing swine slurry odor. Warburton et al., 1980 *Proceeding of the Fourth International Symposium on Livestock Wastes*, p. 309–313. However, PAC can provide considerable odor reduction of swine slurry when used alone or in combination with other agents described above.

Olfactory cross-adaptation ("cross-adaptation") is another methodology for inhibiting the perception of malodor. Cross-adaptation is the decrease in the perceived odor sensitivity to one odorant after exposure to another odorant. Cross-adaptation has commonly been interpreted as a measure of the degree to which odors share common sensory channels. Although it has long been known that perceptual similarity influences cross-adaptation, recent evidence suggests that structural similarity, in the absence of perceptual similarity, can also influence cross-adaptation. Pierce et al., Chem. Senses, 20: 401–411 (1995); Pierce et al., J. Soc. Cosmet. Chem., 47: 363–375 (Dec. 1996). Pierce et al. report the cross-adaptation of sweaty-smelling 3-methyl-2-hexenoic acid (3M2H) by its ethyl esters.

There remains a need for compositions and methods for reducing malodor from animal urine and fecal matter in, inter alia, farming operations, the home, and in human, stand-alone facilities.

SUMMARY OF THE INVENTION

In one aspect, the present invention relates to a method for reducing animal waste malodor comprising adding cross-adapting agents or odor-reducing agents in combination with cross-adapting agents to the animal waste.

In a further aspect, the present invention relates to a method for reducing non-human animal waste malodor comprising adding odor-reducing agents to the diet of the non-human animals.

In a further aspect, the present invention relates to a method for reducing animal waste malodor comprising adding odor-reducing agents to the diet of the animals and adding cross-adapting agents to the waste of the animals.

In another aspect, the present invention relates to compositions comprising either cross-adapting agents or odor-reducing compounds in combination with cross-adapting agents and methods for reducing animal waste malodor using these compositions.

In another aspect, the present invention relates to methods for reducing animal waste malodor at a locus comprising adding odor-reducing agents to the locus, alone or in combination with cross-adapting agents.

BRIEF DESCRIPTION OF THE DRAWINGS

FIG. 1 depicts pleasantness ratings of swine slurry obtained with the LMS with the treatment indicated using a rating scale from −11 (extremely unpleasant) to +11 (extremely pleasant)(see text for details).

DETAILED DESCRIPTION

We have discovered that cross-adaptation is an effective methodology for inhibiting the perception of malodors caused by volatile organic acids and sulfur compounds such as those reported to be formed in domestic animal fecal material. Persaud et al., supra.

In general, the proposed method combines the use and/or incorporation of odor-reducing agents such as powdered activated carbon, bismuth compounds, and CCC, alone or in combination with cross-adapting agents, e.g., the ethylesters of 3-methyl-2-hexenoic acid (3M2H) and their homologues, to reduce and/or eliminate malodor caused by animal waste, e.g., urine and/or fecal matter. The odor-reducing agents can be incorporated into the diet of, e.g., domestic animals such as pigs, cows, horses, and chickens for "internal deodorization", as was done with humans with colostomies and/or incontinence problems. Alternatively, the stored fecal material from these animals can be mixed with PAC, CCC, and/or bismuth compounds and further treated with cross-adapting agents such as the 3M2H ethylesters and their homologues.

The terms "a, an and the" as used herein include the plurals of those same words.

The term "malodor" as used herein refers to the unpleasant smell associated with/emanating from animal waste such as that caused by the presence of compounds including, but not limited to, volatile, odorous, organic acids as well as sulfur compounds and indoles.

The term "odor-reducing agent" as used herein refers to, without limitation, any compound, agent, or combination thereof that is effective in reducing or eliminating malodor. The term includes, without limitation, CCC, bismuth compounds, and PAC.

The term "bismuth compounds" as used herein includes, without limitation, bismuth salicylate (BiS), bismuth subgallate (BiG) and bismuth citrate (BiC).

The term "cross-adapting agent" as used herein refers, without limitation, to any compound, agent, or combination thereof that is effective in decreasing sensitivity to one odorant after exposure to the cross-adapting agent. The term includes, without limitation, ethylesters of 3M2H acid. The ethyl esters of 3M2H include, without limitation, the Z and E ethyl esters. Exemplary homologues include, without limitation, 3-methyl-2-pentenoic (3M2P) and 3-methyl-2-octenoic (3M2O) acid.

The term "locus" as used herein refers to any site containing animal waste and includes, without limitation, pig pens, horse stables, litter boxes, and other bedding materials, ponds, stand-alone human facilities, compost facilities for mushroom farmers and human waste-treatment facilities. The term locus as used herein does not include ostomy and colostomy bags for human use.

The term "stand-alone human facilities" as used herein includes, without limitation, facilities that are not connected to a sewer system or septic tank such as, for example, portable facilities and outhouses.

The term "animal" as used herein refers to vertebrates, more preferably, mammals including humans.

The term "animal waste" as used herein refers, without limitation, to animal excrements including feces, urine, composted animal waste, and other body secretions containing malodor.

It is expected that the range of effective concentrations for the odor reducing agents for external use will be approximately 1–10%.

The effective concentration ranges for the cross-adapting agents is expected to be approximately 0.01% to 0.75% by weight.

The effective concentrations for ingestion of the odor-reducing agents is expected to be approximately 2–6 mg per pound of the animal's body weight.

There are numerous procedures for probing human perception of odors. One recently developed for obtaining perceived intensity is the Labeled Magnitude Scale (LMS). Unlike categorical data from questionnaires, which are typically ordinal, this category-ratio scale is intended to yield ratio-level data with a true zero and an orderly relationship among its values. Rather than describing the relationship between any two points on an interval scale in the units of measure that were used to generate the scale, e.g., stimulus X is 10 units more intense than stimulus Y, where the units of intensity are not readily transformed into personal experience, the LMS allows psychophysical data to be expressed as ratios, e.g., stimulus X is two-fold more intense than stimulus Y. The underlying linear values of the LMS span the range 0–94.53, where the value of the upper bound was empirically determined as the geometric mean for "Strongest Imaginable."

Although a decline in intensity is sought, strong neutral or weakly pleasant odors are less offensive than unpleasant odors and are within the scope of this invention.

Evaluation of pleasantness cannot be performed with the LMS because pleasantness has both positive and negative valence. Data regarding pleasantness can be elicited by using rating scales, e.g., −11 to +11 with "Extremely Unpleasant" and "Extremely Pleasant" at the end points and "Neither Pleasant Nor Unpleasant" representing the midpoint.

In the experiments disclosed below, we used individuals (both males and females) who were initially unfamiliar with the odor of swine manure. These individuals represented a naïve subject pool. Additionally, we used different subjects for each experiment.

We used both the LMS and −11/+11 pleasantness rating scales to determine whether raw swine slurry that has been treated with odor-reducing/cross-adapting agents exhibited a shift in hedonic ratings from the typical "Very Unpleasant" to at least the neutral point of the scale.

After being trained in the use of the LMS and pleasantness rating scales (by exposures to and ratings of various concentrations of standard odorants, e.g., phenyl ethyl alcohol [rose], amyl acetate [banana], Galoxolide° [musky], butanol [industrial/chemical/medicinal/], methyl salicylate [wintergreen], etc.) evaluators rated the intensity and pleasantness of swine slurry. Samples were presented in random order with a 60-second inter-stimulus interval (to minimize adaptation to the odors). Individuals first rated the overall intensity of the sample on the LMS (which were seen on a computer screen; ratings were automatically recorded to disk). Next, the pleasantness of the sample was evaluated on a horizontal line with the following visual guides: −11 is Most Unpleasant Thing I've Ever Smelled; 0 is Neither Pleasant Nor Unpleasant; +11 is Most Pleasant Thing I've Ever Smelled.

Although the materials may successfully eliminate malodor in slurry, the samples may still smell strong and slightly unpleasant. Therefore, it is important to obtain sample characteristics smelled by panelists, by using adjectives. Furthermore, slurry samples were directly compared with bagged, ready-for-sale compost to determine whether the treatments eliminated the slurry malodor to the same degree as recycled materials.

All samples were presented twice. Each session lasted about one hour. Data were analyzed with both parametric and non-parametric tests. Parametric tests assume that the data (when converted to Z-scores) form a normal distribution with a mean of 0 and a standard deviation of 1. In some instances, the data do not meet this assumption. When this occurs distribution-free non-parametric tests are used. Post-hoc tests, using adjusted p-values, determined which samples were significantly different from slurry. Many panels of individuals were required to fully evaluate all of the samples.

A significant decrease in the unpleasantness of the odor was achieved as a result of following the methods disclosed herein. The combinations of CCC and EE3M2H as well as PAC and EE3M2P appeared to be the most effective combinations. In addition, the intensity of the swine slurry odor was markedly reduced by the treatments. Subsequent analysis suggested that the best attenuation of the intensity occurred when pig feces was mixed with the same two above-cited combinations that reduced unpleasantness. Although the mixtures of odor-reducing and cross-adapting agents were not sufficient to render a "pleasant" odor rating by the judges, the ratings did shift from unpleasant to nearly neutral. These results demonstrate the feasibility and utility of the invention in achieving malodor reduction. It is expected that even greater odor-reducing efficacy will be derived from incorporating CCC and BiG into the animal's diet, as is recommended for human use of these compounds, with subsequent use of cross-adapting ethylesters with or without odor-reducing agents to further attenuate residual malodor in stored fecal material.

The following examples are meant to illustrate the invention, not limit it. Those skilled in the art will recognize modifications which are within the spirit and scope of the inventions as set forth in the appended claims.

EXAMPLE 1

Treatment of Swine Slurry with Odor-reducing Agent or Cross-adapting Agent

We attempted amelioration of odor from swine slurry. Swine slurry is a highly malodorous aqueous mixture of pig feces, urine, body secretions and spent feed. The odor-reducing agents and cross-adapting agents listed in Table 1 were used. The concentrations of odor-reducing and cross-adapting agents used are also presented in Table 1. Each concentration was mixed with 1 gm of untreated swine slurry. Untreated swine slurry served as a control.

TABLE 1

Compounds Tested for Reduction of Swine Slurry Malodor

| Additive | Concentration by weight |
| --- | --- |
| ground up CCC | 1–10% |
| Bismuth Subgallate (BiG)* | 1–10% |
| Bismuth Salicylate (BiS)* | 1–10% |
| Bismuth Citrate (BiC)* | 1–10% |
| Ethyl Ester of 3M2H (EE3M2H) | 0.01–.025% |
| Ethyl Ester of E3M2P (EE3M2P) | 0.01–.025% |
| Ethyl Ester of Z3M2P (ZE3M2P) | 0.01–.025% |
| Ethyl Ester of 3M2O (EE3M2O) | 0.01–.025% |
| PAC* | 1–5% |

*PAC and Bismuth salts were not effective when used alone at concentrations less than 1% in this testing.

Initial olfactory evaluations by several judges suggested that CCC and BiG appeared to suppress the stronger malodor notes in the swine slurry.

EXAMPLE 2

Treatment of Swine Slurry with Combinations of Odor-reducing and Cross-adapting Agents In the second experiment, we added combinations of odor-reducing and cross-adapting agents to 1 gm portions of swine slurry. These combinations included BiG and CCC, BiG and EE3M2H, PAC and EE3M2P, PAC and ZE3M2P and CCC and EE3M2H. The best combinations appeared to be PAC with EE3M2P, BiG with EE3M2H or CCC with EE3M2H.

Twelve subjects, about half of whom were women, judged the slurry treated with CCC and EE3M2O as smelling significantly less unpleasant (p=0.03) than raw slurry (there was a gender difference [data not shown]—women gave more unpleasant ratings).

TABLE 2

Combinations of Cross-Adapting and Odor-Reducing Agents

| Additive | Concentration by weight of slurry |
| --- | --- |
| CCC + BiG | 1% each by weight of slurry |
| BiG + EE3M2H | 10% BiG and 0.25% EE3M2H |
| PAC + EE3M2P | 1% PAC and 0.01% EEM2P |
| PAC + ZE3M2P | 1% PAC and 0.01% ZE3M2P |
| CCC + EE3M2H | 10% CCC and 0.25% EE3M2H |

EXAMPLE 3

Treatment of Larger Portions of Swine Slurry with Odor-reducing and Cross-Adapting Agents In subsequent testing, we used 10 to 30 gm portions of swine slurry. The mixtures included swine slurry plus the following: CCC; EE3M2H; BiG; PAC; EE3M2P; EZ3M2P; or EE3M20; and the following combinations of these materials: CCC and BiG; PAC and CCC; PAC and CCC. In addition, control odors included untreated swine slurry as well as BiG, CCC, EE3M2H and CCC plus EE3M2H, all without swine slurry. These were then subjected to rigorous psychophysical testing.

CCC and BiG were added at 10% by weight; PAC was added at 1% by weight. EE3M2H and EE3M20 were used at 0.25% by weight; and EE3M2P and EZ3M2P were used at 0.01%–0.50% by weight.

All references cited herein are hereby incorporated by reference in their entirety.

What is claimed is:

1. A method for reducing animal urine and feces malodor, said method comprising adding an effective amount of an odor-reducing agent and an effective amount of a cross-adapting agent to said animal waste.

2. The method of claim 1 wherein said odor-reducing agent is selected from the group consisting of chlorophyll copper complex (CCC), bismuth compounds, and powdered activated charcoal (PAC).

3. The method of claim 2 wherein the bismuth compounds are selected from the group consisting of bismuth salicylate (BiS), bismuth subgallate (BiG) and bismuth citrate (BiC).

4. The method of claim 2 or 3 wherein the concentration of odor-reducing agent ranges from about 0.5% to about 15% by weight of said animal urine and feces.

5. The method of claim 1 wherein the cross-adapting agent is an ester of 3-methyl-2-hexenoic acid, or a homologue thereof.

6. The method of claim 5 wherein the concentration of cross-adapting agent ranges from about 0.01% to about 0.75% by weight of said animal urine and feces.

7. A method for reducing animal urine and feces malodor comprising adding an effective amount of a composition comprising an odor-reducing agent and an effective amount of a cross-adapting agent, wherein said odor-reducing agent is selected from the group consisting of CCC, bismuth compounds, and PAC.

8. A method for reducing animal urine and feces malodor at a locus, said method comprising adding an effective amount of a composition to a locus, wherein said composition comprises an odor-reducing agent and a cross-adapting agent.

9. The method of claim 8 wherein the cross-adapting agent is an ester of 3-methyl-2-hexenoic acid, or a homologue thereof.

10. The method of claim 9 wherein the concentration of cross-adapting agent ranges from about 0.01% to about 0.75% by weight of said animal waste.

11. The method of claim 7 wherein said bismuth compounds are selected from the group consisting of BiS, BiG, and BiC.

12. The method of claim 7 wherein said cross-adapting agent is an ester of 3-methyl-2-hexenoic acid, or a homologue thereof.

* * * * *